United States Patent
Robert et al.

(10) Patent No.: US 10,138,880 B2
(45) Date of Patent: Nov. 27, 2018

(54) PERISTALTIC PUMP FOR INDUCTOR THERMAL MANAGEMENT

(71) Applicant: Ford Global Technologies, LLC, Dearborn, MI (US)

(72) Inventors: Brian Joseph Robert, St. Clair Shores, MI (US); Alvaro Masias, Ann Arbor, MI (US); Vincent Skalski, Plymouth, MI (US); Serdar Hakki Yonak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 15/343,680

(22) Filed: Nov. 4, 2016

(65) Prior Publication Data

US 2018/0128257 A1    May 10, 2018

(51) Int. Cl.

| H01F 27/10 | (2006.01) |
|---|---|
| H01F 27/02 | (2006.01) |
| F04B 43/12 | (2006.01) |
| B60K 6/44 | (2007.10) |
| F04B 49/06 | (2006.01) |
| H01F 27/28 | (2006.01) |

(52) U.S. Cl.
CPC .............. F04B 43/12 (2013.01); B60K 6/44 (2013.01); F04B 43/1223 (2013.01); F04B 49/065 (2013.01); H01F 27/025 (2013.01); H01F 27/2876 (2013.01)

(58) Field of Classification Search
CPC .... F04B 43/12; F04B 43/1223; F04B 49/065; B60K 6/44; H01F 27/025; H01F 27/2876; H01F 27/02; H01F 27/08; H01F 27/10; H01F 27/105; H01F 27/14; H01F 27/20
USPC .......... 336/57, 58, 61, 94, 90, 212; 361/381, 361/676, 274.2
See application file for complete search history.

(56) References Cited

U.S. PATENT DOCUMENTS

| 3,545,538 | A | * | 12/1970 | Wilson | F28F 9/013 165/104.33 |
|---|---|---|---|---|---|
| 4,715,435 | A | * | 12/1987 | Foret | F04B 43/1223 165/120 |
| 6,537,799 | B2 | | 3/2003 | Chow et al. | |
| 9,103,761 | B2 | | 8/2015 | Nassef et al. | |
| 9,230,726 | B1 | | 1/2016 | Parker et al. | |

(Continued)

*Primary Examiner* — Mangtin Lian
(74) *Attorney, Agent, or Firm* — David B. Kelley; Brooks Kushman P.C.

(57) ABSTRACT

A vehicle inductor assembly includes an inductor, a thermal plate, an emitter, and a controller. The inductor is secured within a housing. The thermal plate supports the inductor and includes a channel having a flexible wall with actionable particles. The emitter is located adjacent the channel. The controller is programmed to activate the emitter to impart a force upon the particles to move the wall such that a cross-sectional area of the channel is adjusted to influence a flow rate of coolant flowing therethrough. The wall may be a membrane partially secured to an interior of the channel and include the actionable particles. The actionable particles may be one of dielectric and magnetic particles and the emitter may selectively output one of a voltage, an electric field, or a magnetic field to move the dielectric or magnetic particles such that the membrane moves to adjust the cross-sectional area of the channel to influence a flow rate of coolant flowing therethrough.

19 Claims, 6 Drawing Sheets

(56) References Cited

U.S. PATENT DOCUMENTS

| | | | |
|---|---|---|---|
| 2010/0040489 A1* | 2/2010 | Rosenzweig | A47L 13/22 417/412 |
| 2010/0315188 A1* | 12/2010 | Hoffman | H01F 27/402 336/57 |
| 2014/0132382 A1* | 5/2014 | Zarei | F16H 57/0417 336/61 |
| 2014/0175867 A1* | 6/2014 | Sung | F16H 57/0412 307/9.1 |
| 2015/0016062 A1* | 1/2015 | Robert | H05K 7/2029 361/700 |

* cited by examiner

PERISTALTIC PUMP FOR INDUCTOR THERMAL MANAGEMENT

TECHNICAL FIELD

This disclosure relates to thermal management systems for vehicle inductor systems.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. An inductor system includes an inductor and assists the HV battery in managing vehicle performance and operations. The inductor system may include a thermal management system to assist in managing thermal conditions of the inductor.

SUMMARY

A vehicle inductor assembly includes an inductor, a coolant channel, a vertically oriented first peristaltic pump, a vertically oriented second peristaltic pump, and a controller. The inductor is mounted within a housing. The coolant channel is disposed below the inductor having an inlet and outlet. The vertically oriented first peristaltic pump is located adjacent a first side of the housing and includes a first channel in fluid communication with the inlet. The vertically oriented second peristaltic pump is located adjacent a second side of the housing and includes a second channel in fluid communication with the outlet. The controller is programmed to direct operation of the first peristaltic pump and the second peristaltic pump to adjust a flow rate of coolant through the channels. The first channel of the first peristaltic pump or the second channel of the second peristaltic pump may include a wall with magnetic particles and an electromagnet located adjacent the wall. The controller may be further programmed to activate the electromagnet to emit a magnetic field to impart a force on the magnetic particles such that the wall moves and a cross-sectional area of the respective channel is adjusted to influence a rate of coolant flow therethrough. The first channel of the first peristaltic pump or the second channel of the second peristaltic pump may include a wall with piezoelectric particles and an emitter located proximate the wall. The controller may be further programmed to activate the emitter to output a voltage to move the piezoelectric particles to adjust a cross-sectional area of the respective channel to influence a rate of coolant flow therethrough. The first channel of the first peristaltic pump or the second channel of the second peristaltic pump may include a wall with materials having electrostriction properties and an emitter located proximate the wall. The controller may be further programmed to activate the emitter to output an electric field to move the materials to adjust a cross-sectional area of the respective channel to influence a rate of coolant flow therethrough. The coolant channel may further include a wall having a membrane partially secured thereto including one of dielectric particles and magnetic particles. The assembly may further include an emitter located adjacent the membrane. The controller may be further programmed to activate the emitter to output a voltage, an electric field, or a magnetic field to impart a force upon the dielectric particles or the magnetic particles to move the membrane to adjust a cross-sectional area of the coolant channel to adjust a rate of coolant flow therethrough. The inductor may include coils and the inductor may be arranged with the coolant channel such that a portion of the coils extend into the coolant channel for contact with coolant flowing through the coolant channel. The inductor housing may be mounted to a transmission case including a mount fixture defining one of the first channel or the second channel therein. The first channel or the second channel may include a wall with actionable particles and the mount fixture may be arranged with one of the vertically oriented peristaltic pumps including an emitter such that activation of the emitter imparts a force upon the actionable particles to move the wall and adjust a cross-sectional area of the first channel or the second channel to influence a flow rate of coolant therethrough.

A vehicle inductor assembly includes an inductor, a thermal plate, an emitter, and a controller. The inductor is secured within a housing. The thermal plate supports the inductor and includes a channel having a flexible wall with actionable particles. The emitter is located adjacent the channel. The controller is programmed to activate the emitter to impart a force upon the particles to move the wall such that a cross-sectional area of the channel is adjusted to influence a flow rate of coolant flowing therethrough. The wall may be a membrane partially secured to an interior of the channel and include the actionable particles. The actionable particles may be one of dielectric and magnetic particles and the emitter may selectively output one of a voltage, an electric field, or a magnetic field to move the dielectric or magnetic particles such that the membrane moves to adjust the cross-sectional area of the channel to influence a flow rate of coolant flowing therethrough. The actionable particles may be magnetic particles and the emitter may be an electromagnet. The controller may be further programmed to activate the electromagnet to output a magnetic force upon the magnetic particles to move the wall to adjust a cross-sectional area of the channel to adjust a flow rate of coolant therethrough. The actionable particles may be dielectric particles and the emitter may output an electric field or voltage. The controller may be further programmed to activate the emitter to output the electric field or voltage upon the dielectric particles to move the wall to adjust a cross-sectional area of the channel to adjust a flow rate of coolant therethrough. The inductor may include one or more coils including a portion extending within a region defined by the channel such that coolant flowing therethrough contacts the portion of the one or more coils. A vertically oriented peristaltic pump may be in fluid communication with the channel and located outside of the housing. The housing may include an upper housing and a lower housing. The lower housing and the inductor may define the channel therebetween. The coils of the inductor may be arranged with the thermal plate such that the coils extend at least partially within the channel.

A vehicle inductor assembly includes an inductor, a coolant channel, a vertically oriented conduit, an emitter, a first sensor, and a controller. The inductor is within a housing disposed between two retention bosses. The coolant channel is disposed within the housing and arranged with the inductor for thermal communication. The vertically oriented conduit is located adjacent the housing and includes a port open to the coolant channel. The emitter is arranged with the conduit to form a peristaltic pump. The first sensor monitors thermal conditions of the inductor. The controller is programmed to activate the pump based on signals received from the first sensor such that a cross-sectional area of a portion of the conduit is adjusted to influence a flow rate of the coolant flowing through the coolant channel. The conduit may be defined within a mount fixture of a transmission housing located adjacent the housing. The conduit may include a wall having magnetic particles. The emitter may be an electromagnet to selectively output a magnetic field to impart a force upon the magnetic particles to adjust a cross-sectional area of the conduit to influence a flow rate of coolant flowing through the coolant channel. The conduit may include a wall having dielectric particles. The emitter may output a voltage or an electric field to impart a force upon the dielectric particles to adjust a cross-sectional area of the conduit to influence a flow rate of coolant flowing through the coolant channel. The controller may be further programmed to activate the emitter based on a sensor measured inductor temperature relative to a predetermined temperature threshold. A second sensor may measure a flow rate of coolant through the coolant channel. The controller may be further programmed to activate the pump based on signals received from the second sensor to adjust a cross-sectional area of a portion of the coolant channel in response to the signals indicating a flow rate outside of a predetermined threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
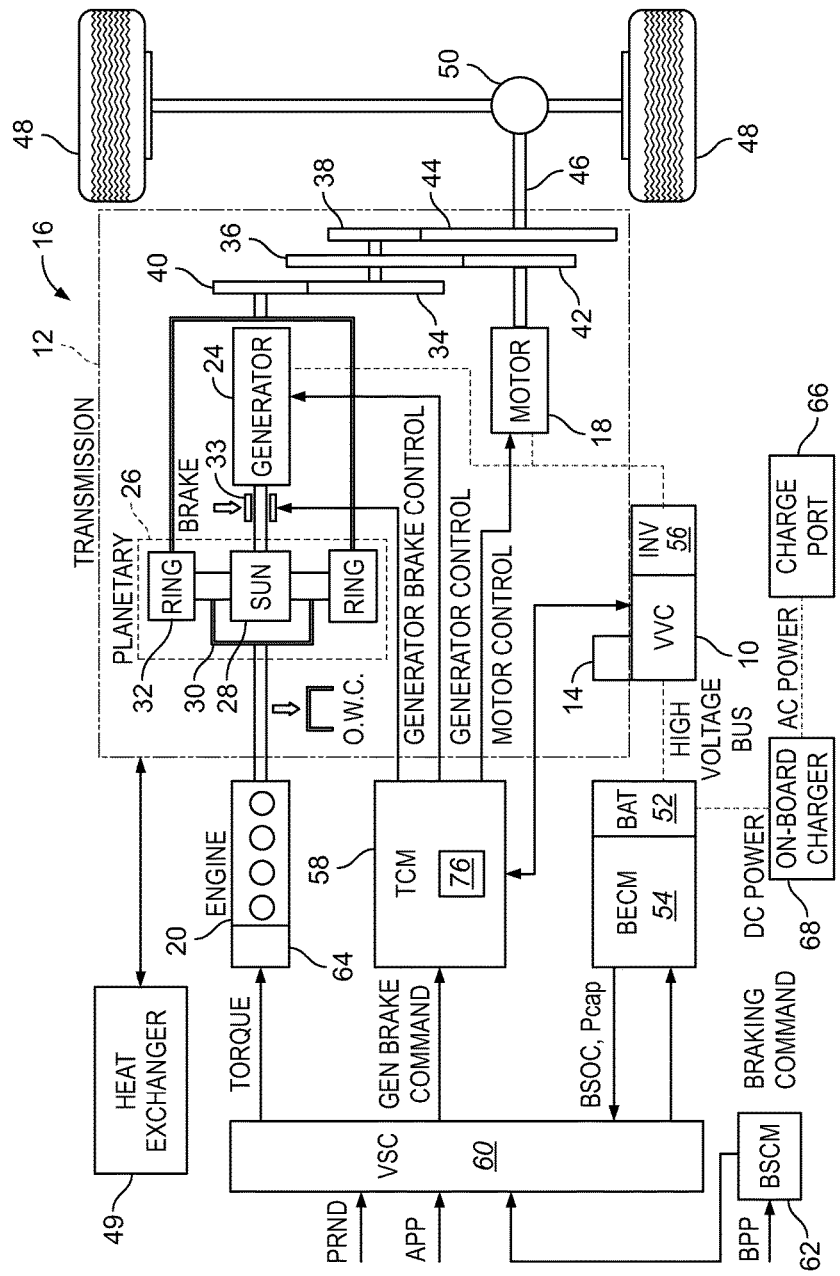
FIG. 1 is a schematic diagram illustrating an example of a battery electric vehicle.

Referring to FIG. 1, a transmission 12 is depicted within a PHEV 16, which is an electric vehicle propelled by an electric machine 18 with assistance from an internal combustion engine 20 and connectable to an external power grid. The electric machine 18 may be an AC electric motor depicted as "motor" 18 in FIG. 1. The electric machine 18 receives electrical power and provides drive torque for vehicle propulsion. The electric machine 18 also functions as a generator for converting mechanical power into electrical power through regenerative braking.

The transmission 12 may have a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12.

The transmission 12 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 includes a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48. The transmission also includes a heat exchanger or automatic transmission fluid cooler 49 for cooling the transmission fluid.

The vehicle 16 includes an energy storage device, such as a battery 52 for storing electrical energy. The battery 52 is a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, Pcap) that is indicative of a battery state of charge (BSOC) and a battery power capability to other vehicle systems and controllers.

The transmission 12 includes a DC-DC converter or variable voltage converter (VVC) 10 and an inverter 56. The VVC 10 and the inverter 56 are electrically connected between the main battery 52 and the first electric machine 18; and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the main battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

Each of the vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position (BPP) that corresponds to a driver request for brake torque. The braking system also includes a brake system control module (BSCM) 62 that communicates with the VSC 60 to coordinate regenerative braking and friction braking. The BSCM 62 may provide a regenerative braking command to the VSC 60.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

The battery 52 periodically receives AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging.

Although illustrated and described in the context of a PHEV 16, it is understood that the VVC 10 may be implemented on other types of electric vehicles, such as a HEV or a BEV.

The transmission 12 may retained within a transmission housing. As described above, the engine 20, the motor 18 and the generator 24 may include output gears that mesh with corresponding gears of the planetary gear unit 26. These mechanical connections may occur within an internal chamber of the transmission housing. A power electronics housing may be mounted to an external surface of the transmission 12. The inverter 56 and the TCM 58 may be mounted within a power electronics housing.

The VVC 10 is an assembly with components that may be mounted both inside and/or outside of the transmission housing of the transmission 12. The VVC 10 includes an inductor assembly 14. In one embodiment, the inductor assembly 14 may be located within the transmission housing. In other embodiments the inductor assembly 14 may be located outside or partially outside of the transmission housing. The VVC 10 may also include a number of switches and diodes that are mounted in the power electronics housing, which is outside of the transmission 12, and are operably coupled to the inductor assembly 14.

Operations of electrified vehicle systems, such as operation of the inductor, benefit from uniform temperature conditions. Liquid cooled systems typically pump coolant through the system using a closed loop path with one pump. As the coolant flows through the system and draws heat a gradient of temperatures across the system may be created. Further, a coolant flow pattern may be disturbed due to various bends and/or irregular shapes of the coolant path within the system which may also contribute to temperature gradients.

A peristaltic pump is an example of a positive displacement pump which may be used with a thermal management system for an inductor to influence a flow of coolant within the system to assist in managing inductor thermal conditions and to combat inductor performance degradation. For example, a peristaltic pump may be based on alternating a compression and a relaxation of a coolant channel to move fluids therein referred to as peristalsis.

FIGS. 2 through 5 show an example of a portion of a peristaltic pump assembly in which magnetic field outputs may be used to drive peristalsis of a coolant channel or conduit of a thermal management system for an inductor system, referred to generally as a coolant channel 100 herein. In this example, the coolant channel 100 is shown disposed between a first set of electromagnets 120, a second set of electromagnets 124, and a third set of electromagnets 128. The coolant channel 100 may have various forms and shapes, such as a tube shape. The coolant channel 100 is shown in a first configuration or natural state in FIG. 2. Portions of the coolant channel 100 are shown in compressed states in FIGS. 3 through 5. The coolant channel 100 may be a component of a conduit system to deliver coolant for thermally communicating with an inductor and may define a flow path for coolant. Examples of coolant suitable for use with the peristaltic pump assembly include glycol, water, mineral oil, and synthetic oil. The coolant channel 100 may include magnetic particles dispersed throughout a layer 104, dispersed in selected portions of the coolant channel 100, or included in a component secured to the coolant channel 100. The layer 104 may be a flexible layer which may comprise a flexible resin-based material, such as polypropylene. The magnetic particles included with the layer 104 are represented by X's in FIGS. 2 through 5; however multiple configurations of magnetic particles are contemplated. Examples of materials having magnetic particles which may suitable for the layer 104 include magnetic steel and iron.

The sets of electromagnets may operate in a controlled sequence to impart a magnetic field at different portions of the coolant channel 100. A controller (not shown) may be in electrical communication with the sets of electromagnets and may be programmed to selectively control operation thereof. The controller may activate the sets of electromagnets in a sequence to facilitate a peristaltic pumping motion in which the cross-sectional area of the coolant channel 100 compresses and expands along a length or portion of the coolant channel 100.

Figure 2:
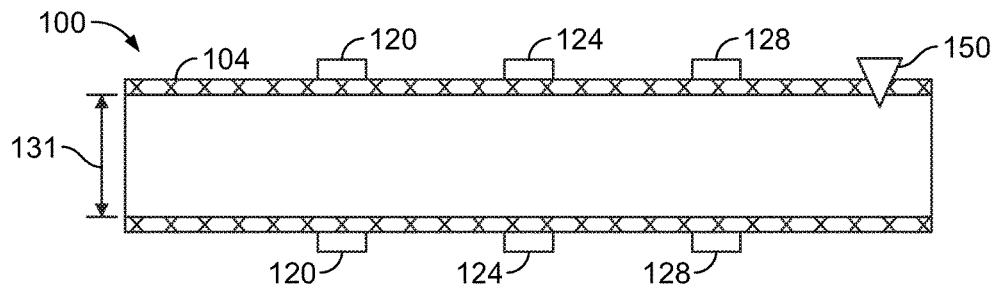
FIG. 2 is an illustrative plan view, in cross-section, of an example of a portion of a peristaltic pump assembly shown in a first configuration.
Figure 3:
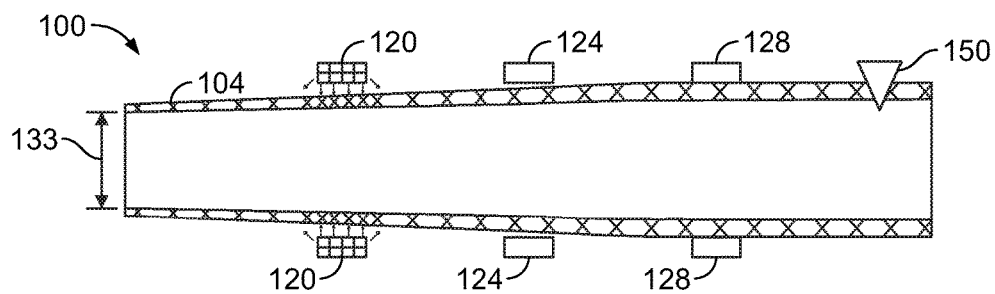
FIG. 3 is an illustrative plan view, in cross-section, of the portion of the peristaltic pump assembly of FIG. 2 shown in a second configuration.

For example, in FIG. 2 the first set of electromagnets 120, the second set of electromagnets 124, and the third set of electromagnets 128 are shown deactivated and the coolant channel 100 is shown in the normal state. Dimension 131 represents a length across the coolant channel 100 in the natural state and may represent a diameter of the coolant channel 100 in a configuration in which the coolant channel 100 is cylindrically tube shaped. The dimension 131 may represent a height or width of an alternatively shaped tube. In FIG. 3, the first set of electromagnets 120 are shown activated and a portion of the coolant channel 100 proximate thereto is shown compressed as a result of the magnetic field imparting a force (represented by arrows) upon the magnetic particles subject to the magnetic field. Dimension 133 represents a length across the coolant channel 100 at a compressed portion thereof. The dimension 133 may represent a diameter of the coolant channel 100 in a configuration in which the coolant channel 100 is cylindrically tube shaped. The dimension 133 may represent a height or width of an alternatively shaped tube. The dimension 133 is less than the dimension 131. The magnetic fields from the electromagnets 120 influence the magnetic particles to move and compress the flexible layer 104 to adjust a cross-sectional area of the coolant flow path defined by the coolant channel 100.

Figure 4:
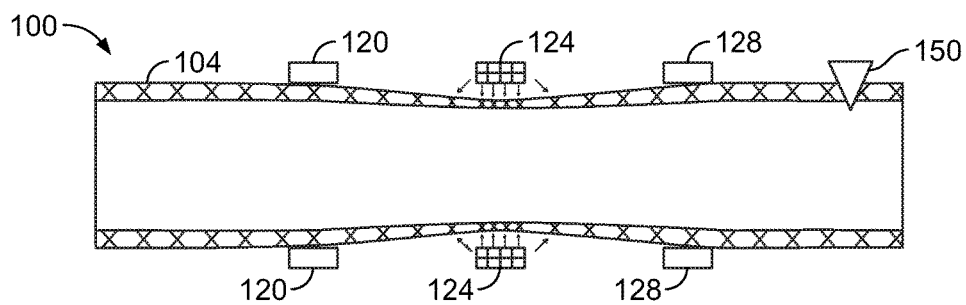
FIG. 4 is an illustrative plan view, in cross-section, of the portion of the peristaltic pump assembly of FIG. 2 shown in a third configuration.
Figure 5:
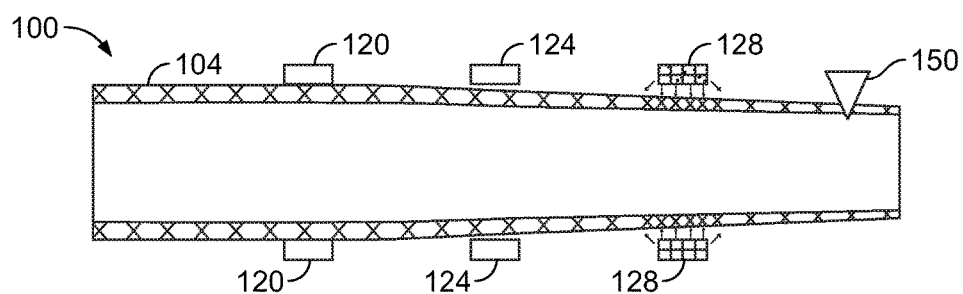
FIG. 5 is an illustrative plan view, in cross-section, of the portion of the peristaltic pump assembly of FIG. 2 shown in a fourth configuration.

In FIG. 4, the second set of electromagnets 124 are shown activated and a portion of the coolant channel 100 proximate thereto is shown compressed as a result of the magnetic field imparting a force upon magnetic particles subject to the magnetic field. In FIG. 5, the third set of electromagnets 128 are shown activated and a portion of the coolant channel 100 proximate thereto is shown compressed as a result of the magnetic field imparting a force upon magnetic particles subject to the magnetic field. Subsequent activation of the sets of electromagnets compresses and then releases portions of the coolant channel 100 to promote peristalsis along the coolant channel 100. Flow rates of coolant traveling through the coolant channel 100 may thus be controlled with various sequences of activating and deactivating the sets of electromagnets.

The controller may also be programmed to operate with one or more sensors. For example, the peristaltic pump system may include a sensor 150. The sensor 150 may be a flow rate sensor arranged with the coolant channel 100 to monitor flow conditions thereof. In another example, a temperature sensor (not shown) may be arranged with the inductor to monitor temperature conditions thereof. The controller may be in electrical communication with the sensor 150 to selectively activate the sets of electromagnets based on signals received therefrom. In response to receiving the signals, the controller may appropriately adjust a flow rate of the coolant within the coolant channel 100 by controlling operation of the sets of electromagnets to assist in managing thermal conditions of the inductor.

FIGS. 6 through 9 show another example of a portion of a peristaltic pump assembly in which voltage or electric field outputs may be used to drive peristalsis of a coolant channel having piezoelectric materials. A coolant channel 200 is part of a thermal management system for an inductor system. In this example, the coolant channel 200 is shown disposed between a first set of emitters 220, a second set of emitters 224, and a third set of emitters 228. The coolant channel 200 may have various forms and shapes, such as a tube shape. The coolant channel 200 is shown in a first configuration or natural state in FIG. 6. Portions of the coolant channel 200 are shown in compressed states in FIGS. 7 through 9. The coolant channel 200 may be a component of a conduit system to deliver coolant for thermally communicating with an inductor and may define a flow path for coolant. Examples of coolant suitable for use with the peristaltic pump assembly include glycol, water, mineral oil, and synthetic oil. The layer 204 may be a flexible layer which may comprise a flexible resin-based material, such as polypropylene. Examples of suitable piezoelectric materials for the coolant channel 200 include quartz, lead zirconate titanate, and barium titanate.

The sets of emitters may operate in a controlled sequence to impart a voltage at different portions of the coolant channel 200. A controller (not shown) may be in electrical communication with the sets of emitters and may be programmed to selectively control operation thereof. The controller may activate the sets of emitters in a sequence to facilitate a peristaltic pumping motion in which the cross-sectional area of the coolant channel 200 compresses and expands along a length or portion of the coolant channel 200.

Figure 6:
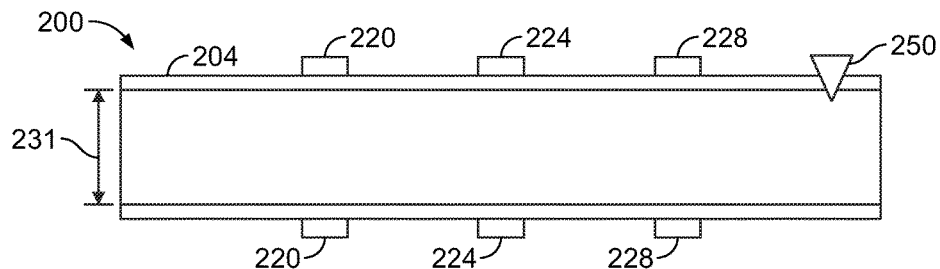
FIG. 6 is an illustrative plan view, in cross-section, of an example of a portion of a peristaltic pump assembly shown in a first configuration.
Figure 7:
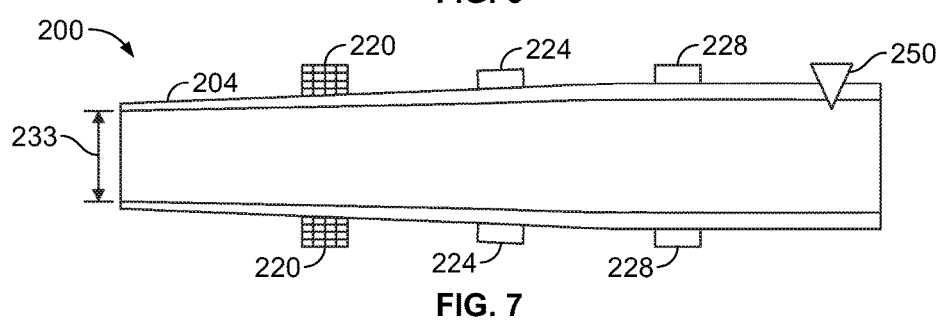
FIG. 7 is an illustrative plan view, in cross-section, of the portion of the peristaltic pump assembly of FIG. 6 shown in a second configuration.

For example, in FIG. 6 the first set of emitters 220, the second set of emitters 224, and the third set of emitters 228 are shown deactivated and the coolant channel 200 is shown in the normal state. Dimension 231 represents a length across the coolant channel 200 in the natural state and may represent a diameter of the coolant channel 200 in a configuration in which the coolant channel 200 is cylindrically tube shaped. The dimension 231 may represent a height or width of an alternatively shaped channel. In FIG. 7, the first set of emitters 220 are shown activated and a portion of the coolant channel 200 proximate thereto is shown compressed as a result of the voltage imparting a force (represented by arrows) upon the dielectric particles subject to the voltage. Dimension 233 represents a length across the coolant channel 200 at a compressed portion thereof. The dimension 233 may represent a diameter of the coolant channel 200 in a configuration in which the coolant channel 200 is cylindrically tube shaped. As such, the voltage from the emitters 220 influence the piezoelectric materials to move and compress the flexible layer 204 to adjust a cross-sectional area of the coolant flow path defined by the coolant channel 200.

Figure 8:
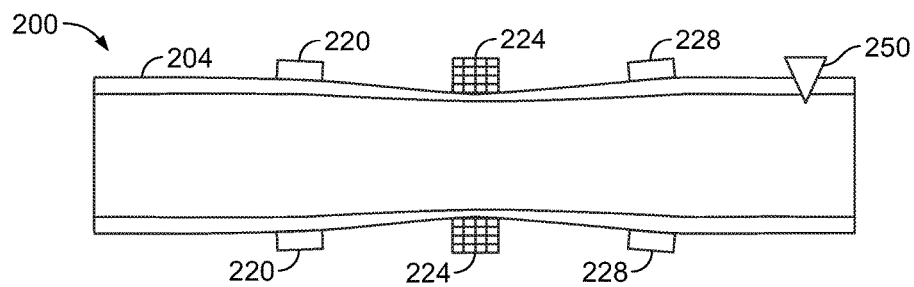
FIG. 8 is an illustrative plan view, in cross-section, of the portion of the peristaltic pump assembly of FIG. 6 shown in a third configuration.
Figure 9:
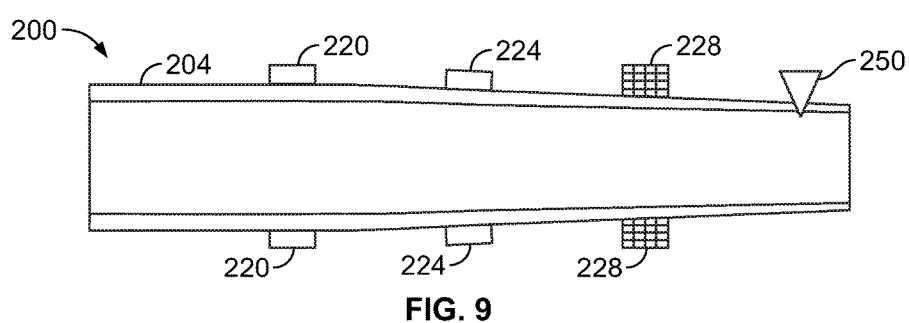
FIG. 9 is an illustrative plan view, in cross-section, of the portion of the peristaltic pump assembly of FIG. 6 shown in a fourth configuration.

In FIG. 8, the second set of emitters 224 are shown activated and a portion of the coolant channel 200 proximate thereto is shown compressed as a result of the voltage imparting a force upon piezoelectric materials subject to the voltage. In FIG. 9, the third set of emitters 228 are shown activated and a portion of the coolant channel 200 proximate thereto is shown compressed as a result of the voltage imparting a force upon piezoelectric materials subject to the voltage. Subsequent activation of the sets of emitters compresses and then releases portions of the coolant channel 200 to promote peristalsis along the coolant channel 200. Flow rates of coolant traveling through the coolant channel 200 may thus be controlled with various sequences of activating and deactivating the sets of emitters.

The controller may also be programmed to operate with one or more sensors. For example, the peristaltic pump system may include a sensor 250. The sensor 250 may be a flow rate sensor. In another example, a temperature sensor (not shown) may be arranged with the inductor to monitor temperature conditions thereof. The controller may be in electrical communication with the sensor 250 to selectively activate the sets of emitters based on signals received therefrom. In response to receiving the signals, the controller may appropriately adjust a flow rate of the coolant within the coolant channel 200 by controlling operation of the sets of emitters to assist in managing thermal conditions of the inductor.

Figure 10:
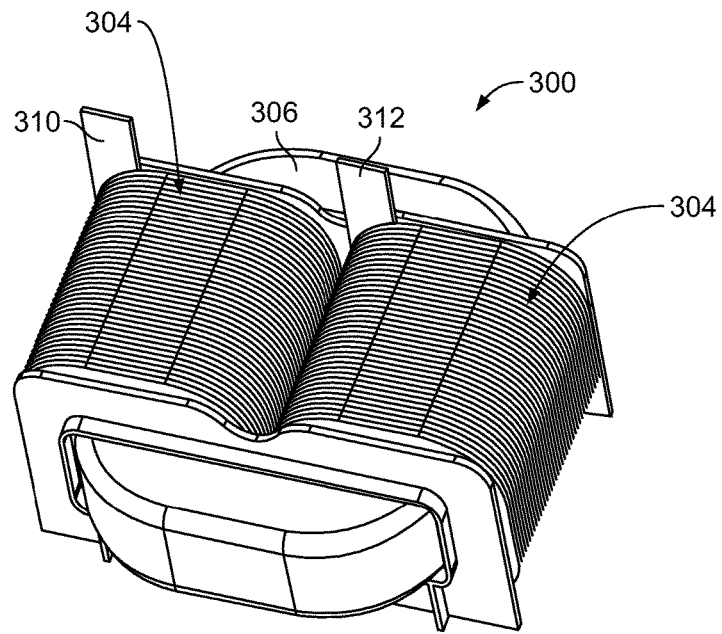
FIG. 10 is a perspective view of an example of an inductor.

FIG. 10 shows an example of an inductor, referred to generally as an inductor 300 herein. The inductor 300 may store electrical energy in a form of magnetic energy. For example, the inductor 300 may include coils 304 wound about a core 306. Energy is stored in a magnetic field in the coils 304 as long as current flows therethrough. The inductor 300 may further include a first terminal tab 310 and a second terminal tab 312. The terminal tabs may assist in transferring and receiving electrical signals with other vehicle components. The coils 304 may operate as a conductor such that a magnetic field is created when electricity flows through the coils 304.

Figure 11:
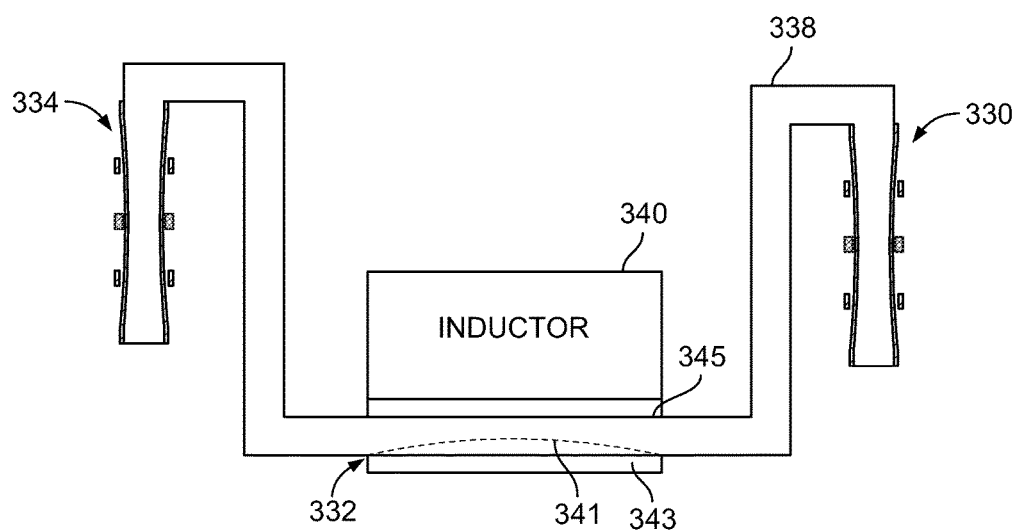
FIG. 11 is an illustrative schematic diagram of an example of a coolant circuit for an inductor.

FIG. 11 shows a schematic example of a portion of an inductor thermal management system including peristaltic pumps. This example includes a first peristaltic pump 330, a second peristaltic pump 332, and a third peristaltic pump 334. The peristaltic pumps operate with one another to control a flow of coolant through a conduit 338 to assist in managing thermal conditions of an inductor 340. For example, the peristaltic pumps may operate with one another to promote a uniform coolant flow throughout the system. Each of the peristaltic pumps may include a coolant channel with a wall having actionable particles as described above and below. For example, the second peristaltic pump 332 may include a membrane 341 secured to a wall 343 of a coolant channel 345. The membrane 341 may include actionable particles that move when a force is imparted thereupon to adjust a cross-sectional area of the coolant channel 345 to influence a flow rate of coolant therethrough as shown in FIG. 11. In a relaxed state, the membrane 341 may be flush or substantially flush with the wall 343.

Figure 12:
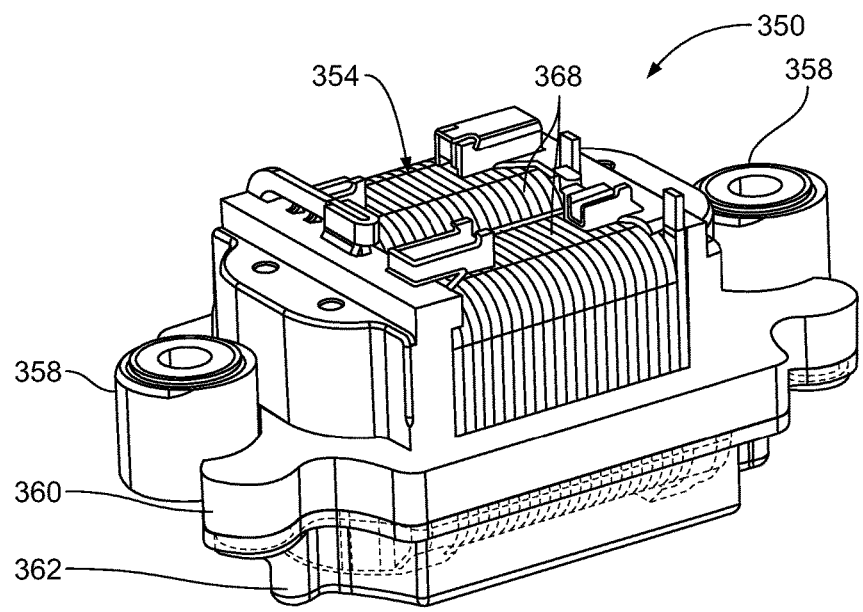
FIG. 12 is a perspective view of an example of an inductor assembly.
Figure 13:
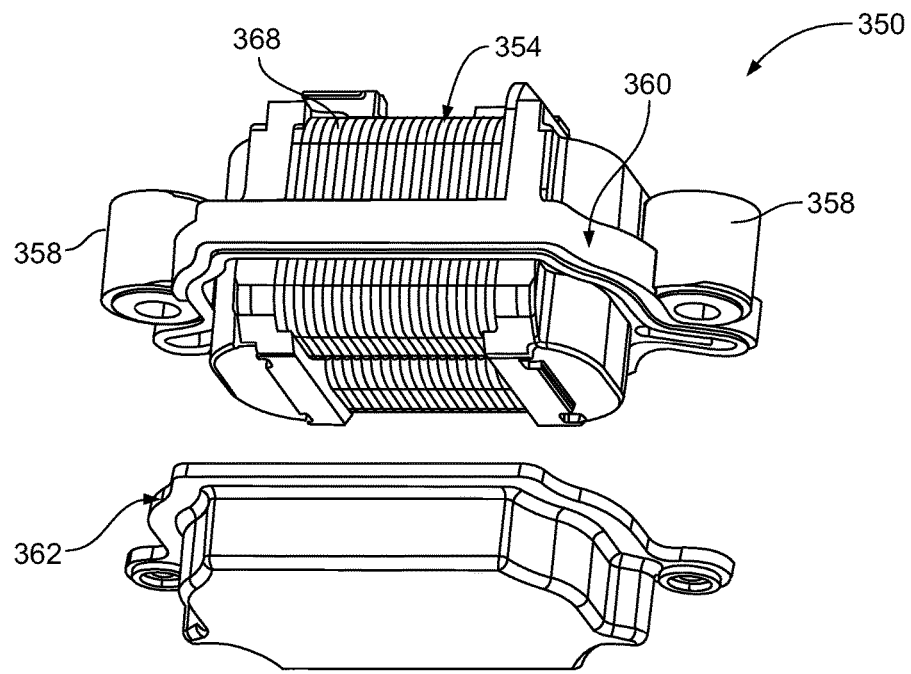
FIG. 13 is a perspective view of the inductor assembly of FIG. 12 shown partially exploded.

FIGS. 12 and 13 show an example of an inductor assembly, referred to generally as an inductor assembly 350 herein. The inductor assembly 350 includes an inductor 354, a pair of retention bosses 358, an upper housing 360, and a lower housing 362. The inductor 354 includes coils 368. The bosses 358 are secured to the upper housing 360 and/or the lower housing 362. The retention bosses 358 assist in retaining the inductor 354 in position. For example, a weight of the inductor 354 may be such that electrical connection with other vehicle components is not sufficient to retain the inductor 354 in position. The inductor 354 is retained within the upper housing 360 and the lower housing 362. The upper housing 360 and the lower housing 362 may be secured to one another to retain coolant therein. The lower housing 362 may define a coolant channel (shown in FIG. 14) arranged with the inductor 354 such that the coils 368 extend within the coolant channel for contact with coolant flowing therethrough. The housings may also be arranged with inductor 354 such that a top portion or core of the inductor 354 may interface with the coolant. The inductor assembly 350 may be positioned relative to a transmission such that one or more peristaltic pumps may operate to control a flow rate of coolant through the coolant channel.

Figure 14:
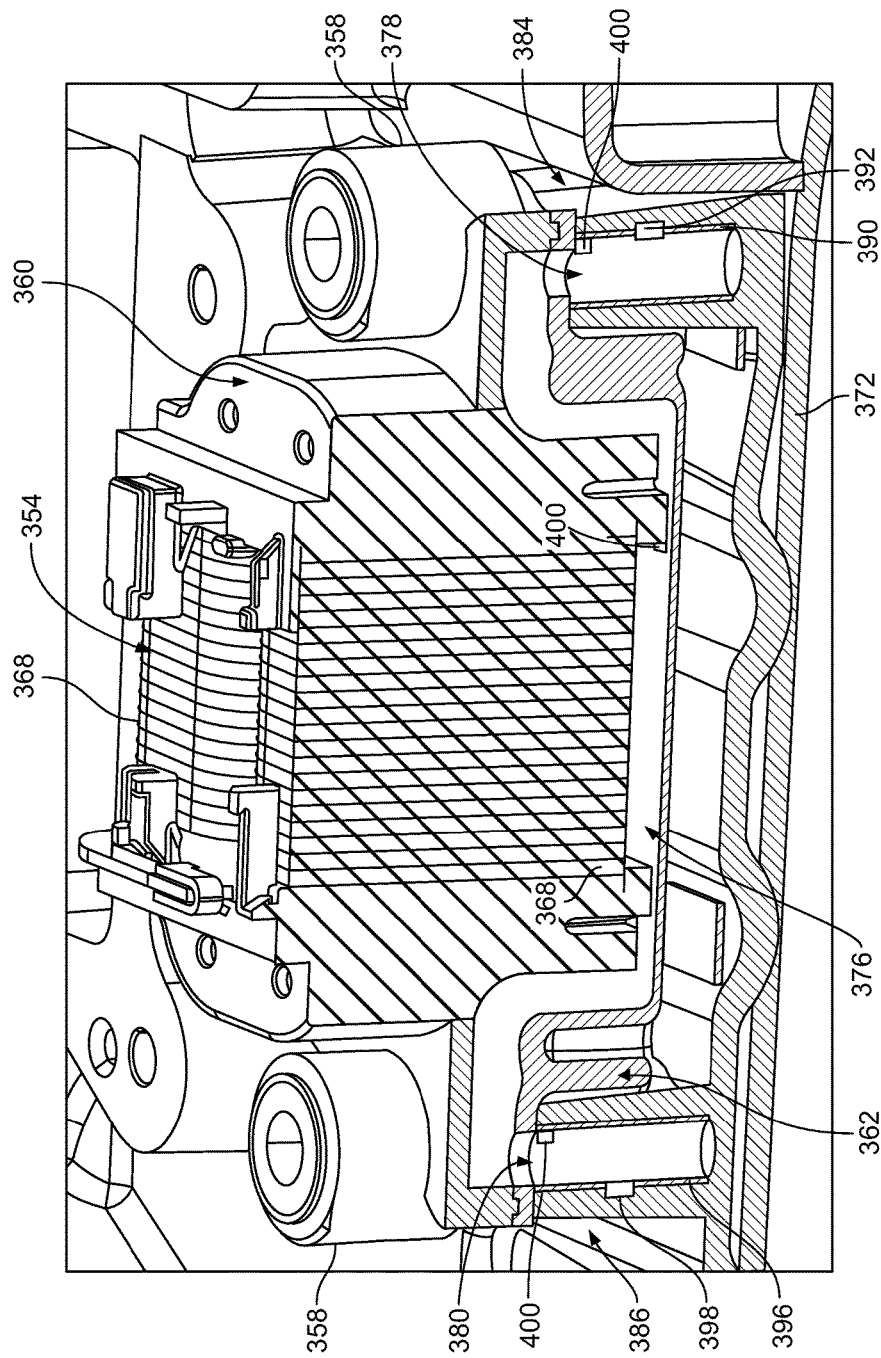
FIG. 14 is a perspective view, in partial cross-section, of an example of an inductor assembly mounted to a transmission case and a portion of a coolant circuit.

FIG. 14 is a cross-sectional view of a portion of the inductor assembly 350 shown mounted to a transmission case 372. A coolant channel 376 is defined between the lower housing 362 and the inductor 354. The coolant channel 376 is disposed beneath the coils 368 to assist in managing thermal conditions of the coils 368. The coolant channel 376 may include features to enhance heat transfer surface area during operation. For example, fins, pedestals, turbulizers, or other similar features may be included within the coolant channel 376 to enhance heat transfer surface area during operation. The coils 368 may extend within the coolant channel 376 for direct contact with coolant flowing therethrough. The coolant channel 376 is in fluid communication with an entry channel 378 and an exit channel 380. The exit channel 380 is in fluid communication with the entry channel 378 via a return loop (not shown). For example, the entry channel 378 and the exit channel 380 may be in fluid communication with a transmission housing to receive coolant therefrom and deliver coolant thereto. The entry channel 378, the coolant channel 376, the exit channel 380, and the return loop form a coolant circuit. The entry channel 378 is defined by a first mount fixture 384. The exit channel 380 is defined by a second mount fixture 386. The first mount fixture 384 and the second mount fixture 386 may be defined by the transmission case 372 and cast components. Each of the mount fixtures may be drilled to create a threaded hole for mechanically mounting the inductor 354, the upper housing 360, and the lower housing 362.

The coolant circuit may be arranged with one or more peristaltic pumps to facilitate a controlled flow rate of coolant through the coolant circuit. For example, the entry channel 378 may include a first wall 390 including actionable particles. The actionable particles may have magnetic or dielectric properties. One or more emitters 392 may be positioned relative to the first wall 390 such that activation of the emitter 392 imparts a force upon the actionable particles of the first wall 390. It is contemplated that the one or more emitters 392 may be oriented similar to an orientation shown in FIGS. 2 through 9. Movement of the actionable particles may adjust a cross-sectional area of the entry channel 378 to operate as a peristaltic pump to control a flow rate of coolant traveling therethrough.

In an example in which the actionable particles are magnetic particles, the emitter 392 may be an electromagnet to output a magnetic field to impart a force upon the magnetic particles. In an example in which the actionable particles are dielectric, the emitter 392 may be a voltage emitter or an electric field emitter. The voltage emitter may be used if the actionable particles of the first wall 390 are particles having piezoelectric properties. The electric field emitter may be used if the actionable particles of the first wall 390 are particles having electrostriction properties.

Similar to the entry channel 378, the exit channel 380 may include a second wall 396 including actionable particles having magnetic or dielectric properties. One or more emitters 398 may be positioned relative to the second wall 396 such that activation of the emitter 398 imparts a force upon the actionable particles of the second wall 396. It is contemplated that the one or more emitters 392 may be oriented similar to an orientation shown in FIGS. 2 through 9. Movement of the actionable particles may adjust a cross-sectional area of the exit channel 380 to operate as a peristaltic pump to control a flow rate of coolant traveling therethrough.

In an example in which the actionable particles are magnetic particles, the emitter 398 may be an electromagnet to output a magnetic field to impart a force upon the magnetic particles. In an example in which the actionable particles are dielectric, the emitter 398 may be a voltage emitter or an electric field emitter. The voltage emitter may be used if the actionable particles of the second wall 396 are particles having piezoelectric properties. The electric field emitter may be used if the actionable particles of the second wall 396 are particles having electrostriction properties. Multiple peristaltic pumps may assist in creating a more uniform flow of coolant throughout the system. The peristaltic pumps may also provide options for focused and/or to supplement coolant pumping within the system. For example, the peristaltic pump may assist in pushing coolant if positioned near an inlet. As another example, the peristaltic pump may assist in pulling coolant if positioned near an outlet. Additionally, a reduction of thermal gradients and hot spots at the inductor 354 may be mitigated if multiple peristaltic pumps are employed and are in communication with a temperature sensing mechanism and controller. Similarly, if a peristaltic pump is positioned near a thermal source, then a single peristaltic pump may be utilized to induce an active and focused coolant flow.

The actionable particles of the entry channel 378 and the exit channel 380 may be dispersed throughout or dispersed in selected portions of the respective coolant channel or may be included in a component secured to the respective coolant channel. The controller may also be programmed to operate with one or more sensors to appropriately adjust a flow rate of the coolant in response to received signals. For example, sensors 400 may be located within the coolant circuit to measure coolant flow rates. In response to receipt of a signal from one of the sensors 400 indicating a flow rate outside of a predetermined threshold, the controller may direct operation of one or more of the peristaltic pumps in response thereto. In another example, a temperature sensor (not shown) may measure thermal conditions of the inductor 354. In response to receipt of a signal from the temperature sensor indicating a temperature outside of a predetermined threshold, the controller may direction operation of the one or more peristaltic pumps in response thereto.

Incorporating one or more of these types of peristaltic pumping motions in the entry channel 378, the coolant channel 376, and/or the exit channel 380 may also provide additional control options relating to coolant flow. For example, a distributed system of coolant channels with moveable walls may influence coolant motion by locally and dynamically manipulating coolant flow at different locations with the conduit system. The moveable walls may be located at portions of the coolant flow path where geometry negatively impacts coolant flow, such as at bends or turns in the coolant channels.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle inductor assembly comprising:
an inductor within a housing mounted to a transmission case including a mount fixture;
a coolant channel disposed below the inductor having an inlet and outlet;
a vertically oriented first peristaltic pump located adjacent a first side of the housing and including a first channel in fluid communication with the inlet;
a vertically oriented second peristaltic pump located adjacent a second side of the housing and including a second channel in fluid communication with the outlet; and a controller programmed to direct operation of the first peristaltic pump and the second peristaltic pump to adjust a flow rate of coolant through the channels, wherein the mount fixture defines one of the first channel or the second channel therein, wherein the first channel or the second channel includes a wall with actionable particles, and wherein the mount fixture is arranged with one of the vertically oriented peristaltic pumps including an emitter such that activation of the emitter imparts a force upon the actionable particles to move the wall and adjust a cross-sectional area of the first channel or the second channel to influence a flow rate of coolant therethrough.

2. The assembly of claim 1 further comprising an electromagnet located adjacent the wall of the first channel or the second channel, wherein the actionable particles of the wall of the first channel of the first peristaltic pump or the wall of the second channel of the second peristaltic pump are magnetic particles, and wherein the controller is further programmed to activate the electromagnet to emit a magnetic field to impart a force on the magnetic particles such that the wall moves and a cross-sectional area of a respective channel is adjusted to influence a rate of coolant flow therethrough.

3. The assembly of claim 1 further comprising an emitter located proximate the wall of the first channel or the second channel, wherein the actionable particles of the wall of the first channel of the first peristaltic pump or the second channel of the second peristaltic pump are piezoelectric particles, and wherein the controller is further programmed to activate the emitter to output a voltage to move the piezoelectric particles to adjust a cross-sectional area of a respective channel to influence a rate of coolant flow therethrough.

4. The assembly of claim 1 further comprising an emitter located proximate the wall of the first channel or the second channel, wherein the actionable particles of the wall of the first channel of the first peristaltic pump or the second channel of the second peristaltic pump include electrostriction properties, and wherein the controller is further programmed to activate the emitter to output an electric field to move the actionable particles to adjust a cross-sectional area of a respective channel to influence a rate of coolant flow therethrough.

5. The assembly of claim 1, wherein the coolant channel further includes a channel wall having a membrane partially secured thereto including one of dielectric particles and magnetic particles, wherein the assembly further includes an emitter located adjacent the membrane, and wherein the controller is further programmed to activate the emitter to output a voltage, an electric field, or a magnetic field to impart a force upon the dielectric particles or the magnetic particles to move the membrane to adjust a cross-sectional area of the coolant channel to adjust a rate of coolant flow therethrough.

6. The assembly of claim 1, wherein the inductor comprises coils, and wherein the inductor is arranged with the coolant channel such that a portion of the coils extend into the coolant channel for contact with coolant flowing through the coolant channel.

7. A vehicle inductor assembly comprising:
an inductor secured within a housing;
a thermal plate supporting the inductor and including a channel having a flexible membrane partially secured to a channel interior and including actionable particles;
an emitter adjacent the channel; and
a controller programmed to activate the emitter to impart a force upon the particles to move the membrane to adjust a channel cross-sectional area to influence a flow rate of coolant flowing therethrough.

8. The assembly of claim 7, wherein the actionable particles are one of dielectric and magnetic particles, and wherein the emitter selectively outputs one of a voltage, an electric field, or a magnetic field to move the dielectric or magnetic particles such that the membrane moves to adjust the cross-sectional area of the channel to influence a flow rate of coolant flowing therethrough.

9. The assembly of claim 7, wherein the actionable particles are magnetic particles, wherein the emitter is an electromagnet, and wherein the controller is further programmed to activate the electromagnet to output a magnetic force upon the magnetic particles to move the membrane to adjust a cross-sectional area of the channel to adjust a flow rate of coolant therethrough.

10. The assembly of claim 7, wherein the actionable particles are dielectric particles, wherein the emitter outputs an electric field or voltage, and wherein the controller is further programmed to activate the emitter to output the electric field or voltage upon the dielectric particles to move the membrane to adjust a cross-sectional area of the channel to adjust a flow rate of coolant therethrough.

11. The assembly of claim 7, wherein the inductor includes one or more coils including a portion extending within a region defined by the channel such that coolant flowing therethrough contacts the portion of the one or more coils.

12. The assembly of claim 7 further comprising a vertically oriented peristaltic pump in fluid communication with the channel and located outside of the housing.

13. The assembly of claim 7, wherein the housing includes an upper housing and a lower housing, and wherein the lower housing and the inductor define the channel therebetween, and wherein coils of the inductor are arranged with the thermal plate such that the coils extend at least partially within the channel.

14. A vehicle inductor assembly comprising:
an inductor within a housing disposed between two retention bosses;
a coolant channel disposed within the housing and arranged with the inductor for thermal communication;
a vertically oriented conduit adjacent the housing, including actionable particles, and including a port open to the coolant channel;
an emitter arranged with the conduit to influence movement of the actionable particles to form a peristaltic pump;
a first sensor to monitor thermal conditions of the inductor; and
a controller programmed to activate the pump based on signals received from the first sensor such that a cross-sectional area of a portion of the conduit is adjusted to influence a flow rate of the coolant flowing through the coolant channel.

15. The assembly of claim 14, wherein the conduit is defined within a mount fixture of a transmission housing located adjacent the housing.

16. The assembly of claim 14, wherein the conduit comprises a wall having the actionable particles, wherein the actionable particles are magnetic particles, and wherein the emitter is an electromagnet to selectively output a magnetic field to impart a force upon the magnetic particles to adjust a cross-sectional area of the conduit to influence a flow rate of coolant flowing through the coolant channel.

17. The assembly of claim 14, wherein the conduit comprises a wall having the actionable particles, wherein the actionable particles are dielectric particles, and wherein the emitter outputs a voltage or an electric field to impart a force upon the dielectric particles to adjust a cross-sectional area of the conduit to influence a flow rate of coolant flowing through the coolant channel.

18. The assembly of claim 14, wherein the controller is further programmed to activate the emitter based on a sensor measured inductor temperature relative to a predetermined temperature threshold.

19. The assembly of claim 14 further comprising a second sensor to measure a flow rate of coolant through the coolant channel, and wherein the controller is further programmed to activate the pump based on signals received from the second sensor to adjust a cross-sectional area of a portion of the coolant channel in response to the signals indicating a flow rate outside of a predetermined threshold.

\* \* \* \* \*